(12) United States Patent
Wakui

(10) Patent No.: US 6,563,610 B1
(45) Date of Patent: May 13, 2003

(54) IMAGE READER

(75) Inventor: Yoshio Wakui, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/356,035

(22) Filed: Jul. 16, 1999

(30) Foreign Application Priority Data

Jul. 17, 1998 (JP) .......................................... P10-203219

(51) Int. Cl.⁷ ................................................. H04N 1/04
(52) U.S. Cl. ...................................... 358/487; 358/474
(58) Field of Search ................................. 358/474, 487, 358/518, 529, 509, 522, 574, 475; 348/71

(56) References Cited

U.S. PATENT DOCUMENTS

| | | | |
|---|---|---|---|
| 6,069,716 A | * 5/2000 | Yamamoto | ................... 358/518 |
| 6,201,618 B1 | 3/2001 | Yamamoto | ................... 358/487 |

* cited by examiner

Primary Examiner—Jerome Grant, II
Assistant Examiner—Negussie Worku
(74) Attorney, Agent, or Firm—Greenblum & Bernstein, P.L.C.

(57) ABSTRACT

In an image reader, a line image sensor optically and electronically reads by scanning a standardized image-recording frame area of a photographic transparency with the line image sensor. In a regular-reading operation, the frame area is scanned at a fine-scan-pitch with the line image sensor. Prior to the regular-reading operation, a pre-reading operation is executed such that the standardized frame area is scanned at a rough-scan-pitch with the line image sensor. It is determined whether an image to be read from the transparency is recorded on a whole of the standardized frame area or a panorama frame area defined and restricted on the standardized frame area. When it is determined that the image to be read is recorded on the panorama frame area, the execution of the regular-reading operation is regulated such that the panorama frame area is scanned with the line image sensor.

12 Claims, 9 Drawing Sheets

IMAGE READER

BACKGROUND OF THE INVENTION

1. Field of the Invention

The present invention relates to an image reader for optically and electronically sensing and reading an image, which is recorded on an image-recording medium, such as a photographic transparency or the like, by illuminating the image-recording medium with a light source and by scanning the illuminated image-recording medium with a line image sensor.

2. Description of the Related Art

Such an image reader per se is well known, and is used in peripheral equipment associated with an image-processing computer for retrieving a recorded or photographed image from a photographic transparency. The image reader includes a solid-state line image sensor, such as a CCD (charge-coupled device) image sensor, a suitable light source for illuminating the photographic transparency, and an optical system for focusing an illuminated optical image on a linear light-receiving surface of the CCD line image sensor. The linear light-receiving surface of the image sensor is defined by a plurality of CCD elements aligned with each other, which converts the focused optical image into a single-line of image-pixel signals.

A reading of the recorded image from the photographic transparency is performed by intermittently and relatively moving the line image sensor with respect to the photographic transparency such that the recorded image is scanned with the line image sensor. At each scanning step, a single-line of image-pixel signals is output from the CCD line image sensor, and a frame of image-pixel signals is obtained from the line image sensor when the scanning of the recorded image with the line image sensor is completed. The frame of image-pixel signals is converted into a frame of digital image-pixel signals, and is stored in a suitable memory medium, such as an IC cord, a floppy disc or the like. If necessary, the frame of digital image-pixel signals may be directly fed from the image reader to an image-processing computer.

Of course, in the image reader, a scanning range, over which the recorded image is scanned with the line image sensor, is previously defined such that a standardized image-recording frame area of the photographic transparency is fully covered by the scanning range.

Recently, a new type of camera has been developed, in which an optical object can be selectively photographed on a photographic film in either a regular format mode or a panorama format mode. Of course, when the regular format mode is selected, the whole of an image-recording frame area of the photographic film is utilized as a photographing-area in a conventional manner. On the contrary, when the panorama format mode is selected, a restricted part of the standardized image-recording frame area of the photographic film is utilized as a photographing-area. Namely, in the panorama format mode, lower and upper side zones of the image-recording frame area are masked such that a panorama or wide image-recording frame area is defined therebetween, and an optical object is photographed on the panorama image-recording frame area.

By using the aforementioned image reader, it is possible to optically and electronically read a photographed image from each of the photographic transparencies obtained from a photographed and developed film including regular-formatted images and panorama-formatted images. As mentioned above, the image reader is designed such that a standardized image-recording frame area of the photographic transparency is fully scanned with the CCD line image sensor. Thus, when a panorama-formatted image is read by the image reader, the whole of the standardized image-recording frame area of the photographic transparency must be fully scanned with the line image sensor even if the panorama-formatted image is recorded on only the panorama image-recording frame area forming a part of the standardized image-recording frame area. In other words, the masked and unexposed lower and upper side zones of the standardized image-recording frame area must be uselessly scanned with the line image sensor whenever the panorama-formatted image is read by the image reader. Of course, the useless scanning operation should be prevented before a reading-time, over which the panorama-formatted image is read by the image reader, can be shortened.

Further, when a frame of digital image-pixel signals, obtained from a photographic transparency carrying a panorama formatted image, is stored in a memory medium, such as an IC memory cord, a floppy disc or the like, a capacity of the memory medium is uselessly consumed because the meaningless pixel-image signals, derived from the masked and unexposed silo lower and upper side zones of the standardized image-recording frame area, must be stored in the memory medium, together with effective image-pixel signals, derived from the panorama formatted image.

SUMMARY OF THE INVENTION

Therefore, an object of the present invention is to provide an image reader which is constituted such that a panorama-formatted image can be effectively read from a panorama image-recording frame area, forming a part of a standardized image-recording area of a photographic transparency, without scanning the whole of the standardized image-recording area with a line image sensor.

In accordance with the present invention, there is provided an image reader which comprises: a line image sensor that optically and electronically senses and reads by scanning an image-recording area of a recording medium with the line image sensor; a regular-reading controller that makes the line image sensor execute a regular reading operation such that the image-recording area of the recording medium is scanned at a regular-reading-scan-pitch with the line image sensor; a pre-reading controller that makes the line image sensor execute a pre-reading operation, prior to the execution of the regular-reading operation, such that the image-recording area of the recording medium is scanned at a pre-reading-scan-pitch, rougher than the regular-reading-scan-pitch, with the line image sensor; a determiner that determines whether an image to be read from the recording medium is recorded on a whole of the image-recording area or a restricted area of the image-recording area on a basis of a series of image-pixel data obtained by the execution of the pre-reading operation; and a regular-reading regulator that regulates the execution of the regular-reading operation such that the restricted area of the image-recording area is scanned with the line image sensor when it is determined by the determiner that the image to be read from the recording medium is recorded on the restricted area of the image-recording area.

The recording medium may be a photographic transparency object having a standardized image-recording frame area, and the restricted area may be a panorama image-recording frame area defined on the standardized image-recording frame area.

In accordance with a first aspect of the present invention, the determiner comprises: a detector that detects two scanning-lines, which respectively correspond to two single-lines of image-pixel data, respectively, obtained by the execution of the pre-reading operation, defining a minimum range in which the restricted area of the image-reading area falls; a first calculator that calculates one of the two scanning-lines as a scan-start-position for the restricted area of the image-recording area on a basis of the pre-reading-scan-pitch and the regular-reading-scan-pitch when the two scanning-lines are detected by the detector; and a second calculator that calculates another of the two scanning-lines as a scan-end-position for the restricted area of the image-recording area on a basis of the pre-reading-scan-pitch and the regular-reading-scan-pitch when the two scanning-lines are detected by the detector. The regular-reading regulator comprises: a first driver controller that relatively and continuously moves the recording medium with respect to the line image sensor, without being intermitted, until the line image sensor is positioned at the scan-start-position; and a second driver controller that relatively and intermittently moves the recording medium with respect to the line image sensor at the regular-reading-scan-pitch from the scan-start-position to the scan-end-position.

In accordance with a second aspect of the present invention, the image reader further comprises a memory medium that temporarily stores the series of image-pixel data obtained by the execution of the pre-reading operation. In this case, the determiner comprises: a data reader that successively reads a single-line of image-pixel data from the memory medium; a calculator that calculates an average data from the single-line of image-pixel data, successively read from the memory medium; and a comparator that compares the calculated average data with a predetermined threshold data to determine whether there is a drastic change between two consecutive single-lines of image-pixel data obtained by the execution of the pre-reading operation, whereby it is determined that there is a boundary, defining the restricted image-recording area, between two consecutive scanning-lines, corresponding the two consecutive single-lines of image-pixel data obtained by the execution of the pre-reading operation, when it is determined by the comparator that there is the drastic change between the two consecutive single-lines of image-pixel data.

In the second aspect of the present invention, the determiner may further comprise: a first calculator that calculates a trailing one of the two consecutive scanning-lines as a scan-start-position for the restricted area of the image-recording area on a basis of the pre-reading-scan-pitch and the regular-reading-scan-pitch when the trailing one of the two consecutive scanning-lines is out of the restricted area of the image-recording area; and a second calculator that calculates a leading one of the two consecutive scanning-lines as a scan-end-position for the restricted area of the image-recording area on a basis of the pre-reading-scan-pitch and the regular-reading-scan-pitch when the leading one of the two consecutive scanning-lines is out of the restricted area of the image-recording area. In this case, the regular-reading regulator comprises: a first driver controller that relatively and continuously moves the recording medium with respect to the line image sensor, without being intermitted, until the line image sensor is positioned at the scan-start-position; and a second driver controller that relatively and intermittently moves the recording medium with respect to the line image sensor at the regular-reading-scan-pitch from the scan-start-position to the scan-end-position.

In accordance with a third aspect of the present invention, there is provided an image reader which comprises: a line image sensor that optically and electronically senses and reads by scanning an image-recording area of a recording medium with the line image sensor; a regular-reading controller that makes the line image sensor execute a regular reading operation such that the image-recording area of the recording medium is scanned at a regular-reading-scan-pitch with the line image sensor; a pre-reading controller that makes the line image sensor execute a pre-reading operation, prior to the execution of the regular-reading operation, such that the image-recording area of the recording medium is scanned at a pre-reading-scan-pitch with the line image sensor; and a determiner that determines whether an image to be read from the recording medium is recorded on a whole of the image-recording area or a restricted area of the image-recording area on a basis of a series of image-pixel data obtained by the execution of the pre-reading operation. The determiner comprises: a detector that detects two scanning-lines, which respectively correspond to two single-lines of image-pixel data, respectively, obtained by the execution of the pre-reading operation, defining a minimum range in which the restricted area of the image-reading area falls; a first calculator that calculates one of the two scanning-lines as a scan-start-position for the restricted area of the image-recording area on a basis of the pre-reading-scan-pitch and the regular-reading-scan-pitch when the two scanning-lines are detected by the detector; and a second calculator that calculates another of the two scanning-lines as a scan-end-position for the restricted area of the image-recording area on a basis of the pre-reading-scan-pitch and the regular-reading-scan-pitch when the two scanning-lines are detected by the detector. The regular-reading controller that relatively and continuously moves the recording medium with respect to the line image sensor, without being intermitted, until the line image sensor is positioned at the scan-start-position, and that relatively and intermittently moves the recording medium with respect to the line image sensor at the regular-reading-scan-pitch from the scan-start-position to the scan-end-position, when it is determined by the determiner that the image to be read from the recording medium is recorded on the restricted area of the image-recording area.

BRIEF DESCRIPTION OF THE DRAWINGS

The object and other objects of the present invention will be better understood from the following description, with reference to the accompanying drawings in which.

DESCRIPTION OF THE PREFERRED EMBODIMENTS

Figure 1:
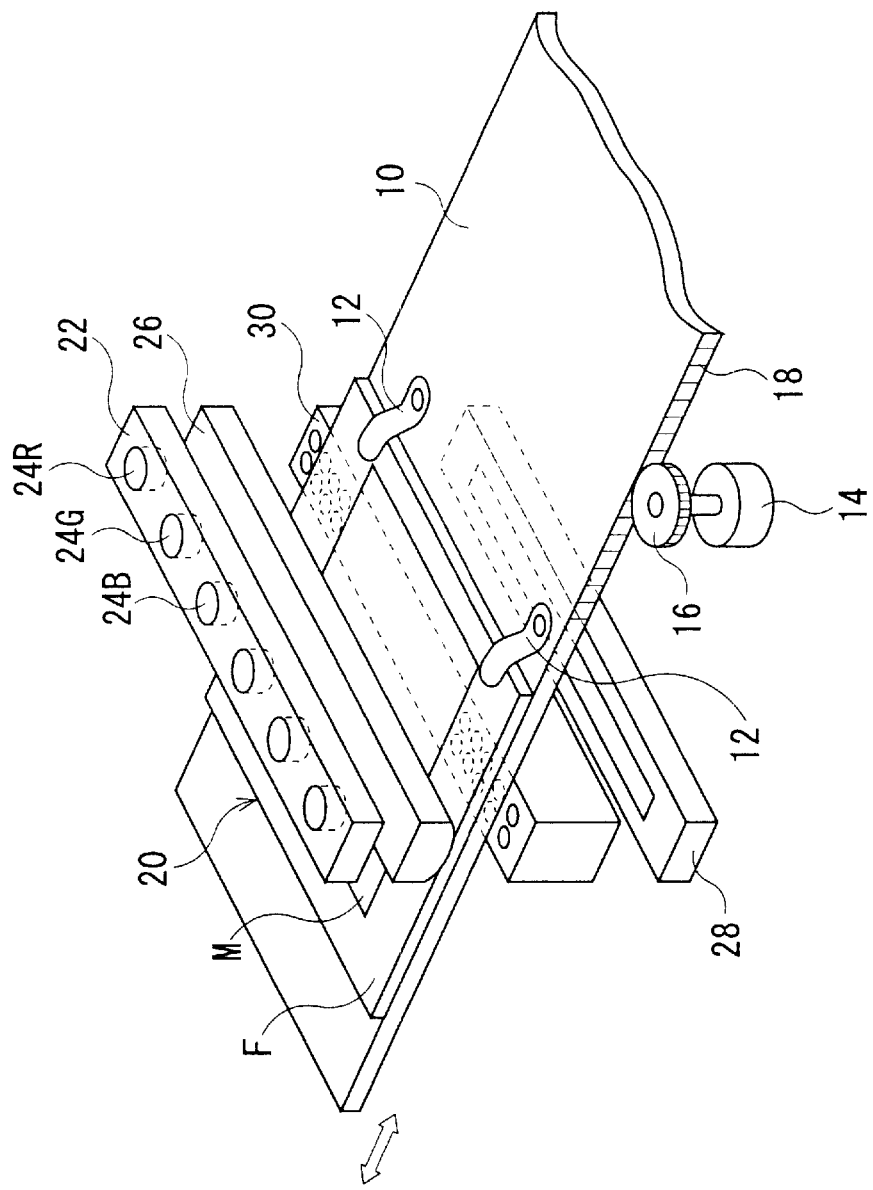
FIG. 1 is a schematic perspective view of an embodiment of an image reader according to the present invention.

FIG. 1 schematically shows an embodiment of an image reader according to the present invention, which is constituted so as to read a recorded color image from a photographic color transparent object, such as a positive transparency object, a negative transparency object or the like. In this drawing, the photographic transparency object is indicated by reference M, and the transparency object M is held by a frame holder F.

Note, in the image reader according to the present invention, a pre-reading operation is executed to determine whether an image to be read is recorded on the photographic transparency object M in a regular format or a panorama format, prior to an execution of a regular-reading operation of the recorded image from the transparency object M, as stated in detail hereinafter.

The image reader comprises a plate-like carriage 10 on which the frame holder F is detachably mounted. Namely, the carriage 10 is provided with a pair of spring fasteners 12 attached thereto, by which the frame holder F is releasably fastened onto the carriage 10. Although not visible in FIG. 1, a rectangular opening is formed in the carriage 10, the opening being large enough to encompass the transparency object M.

The plate-like carriage 10 is movable in the directions indicated by an open arrow shown in FIG. 1, and the movement of the carriage 10 is carried out by a suitable drive motor 14, such as a stepping motor, a servo motor or the like. Namely, the drive motor 14 has a pinion 16, fixedly mounted on an output shaft thereof, which is meshed with a rack 18 formed on a longer side of the carriage 10.

The image reader is also provided with a light source 20, which includes an elongated frame member 22 having red-light emitters 24R, green-light emitters 24G and blue-light emitters 24B supported thereby. Although only six light emitters (24R, 24G, 24B) are representatively shown in FIG. 1, in actuality, a plurality of red-light emitters 24R, a plurality of green-light emitters 24G and a plurality of blue-light emitters 24B are held in the elongated frame member 22 and are alternately arranged uniformly thereal-ong. Each of the light emitters may comprise a light emitting diode (LED) emitting a predetermined monochromatic light (red, green or blue).

As is apparent from FIG. 1, the light source 20 is arranged transversely above a path along which the plate-like carriage 10, and therefore the transparency object M, is moved. During a regular-reading operation of the image reader, the plurality of red-light emitters 24R, the plurality of green-light emitters 24G, and the plurality of blue-light emitters 24B are cyclically turned ON, whereby the transparency object M is cyclically subjected to monochromatic illuminations from the light source 20. For example, in succession, the red-light emitters 24R are turned ON, emitting red-light rays, then the green-light emitters 24G are turned ON, emitting green-light rays, and finally the blue-light emitters 24B are turned ON, emitting blue-light rays. Namely, the emissions of the three-primary colors of light from the light source 20 are cyclically repeated in the order of: the red-light emission, the green-light emission and the blue-light emission, during the regular-reading operation of the image reader. On the other hand, during a pre-reading operation of the image reader, only a plurality of monochromatic-light emitters (24R, 24G, or 24B) is turned ON, whereby the transparency object M is subjected to a monochromatic illumination from the light source 20.

The image reader is further provided with a cylindrical condenser lens 26, interposed between the light source 20 and the path of the transparency object M. The monochromatic light rays (red, green or blue), emitted from the light source 20, are condensed by the cylindrical condenser lens 26 and are directed in parallel toward the transparency object M.

Furthermore, the image reader is provided with a one-dimensional CCD line image sensor 28, and a focusing lens system 30 associated therewith. The CCD line image sensor 28 is arranged transversely below the path of the transparency object M, and is aligned with the optical axes of the elongated light source 20. In this embodiment, the focusing lens system 30 is formed as a rod lens array, and is interposed between the CCD line image sensor 28 and the path of the transparency object M. Due to the lens system 30, the monochromatic light rays, passing through the transparency object M, are focused onto a linear light-receiving surface of the CCD line image sensor 28.

The CCD line image sensor 28 includes a plurality of CCD elements aligned with each other, and the linear light-receiving surface is defined by the alignment of the CCD elements. Each of the CCD elements generates and accumulates electric charge in accordance with an amount of light rays received thereby, and a degree of accumulation of electric charge in each CCD element depends on a time of exposure of the CCD elements of the CCD line image sensor 28 to the light rays. Note, as is well known, the CCD line sensor is provided with an electronic shutter function, by which the time of exposure, i.e. a time of electric-charge-accumulation, is regulated.

Figure 2:
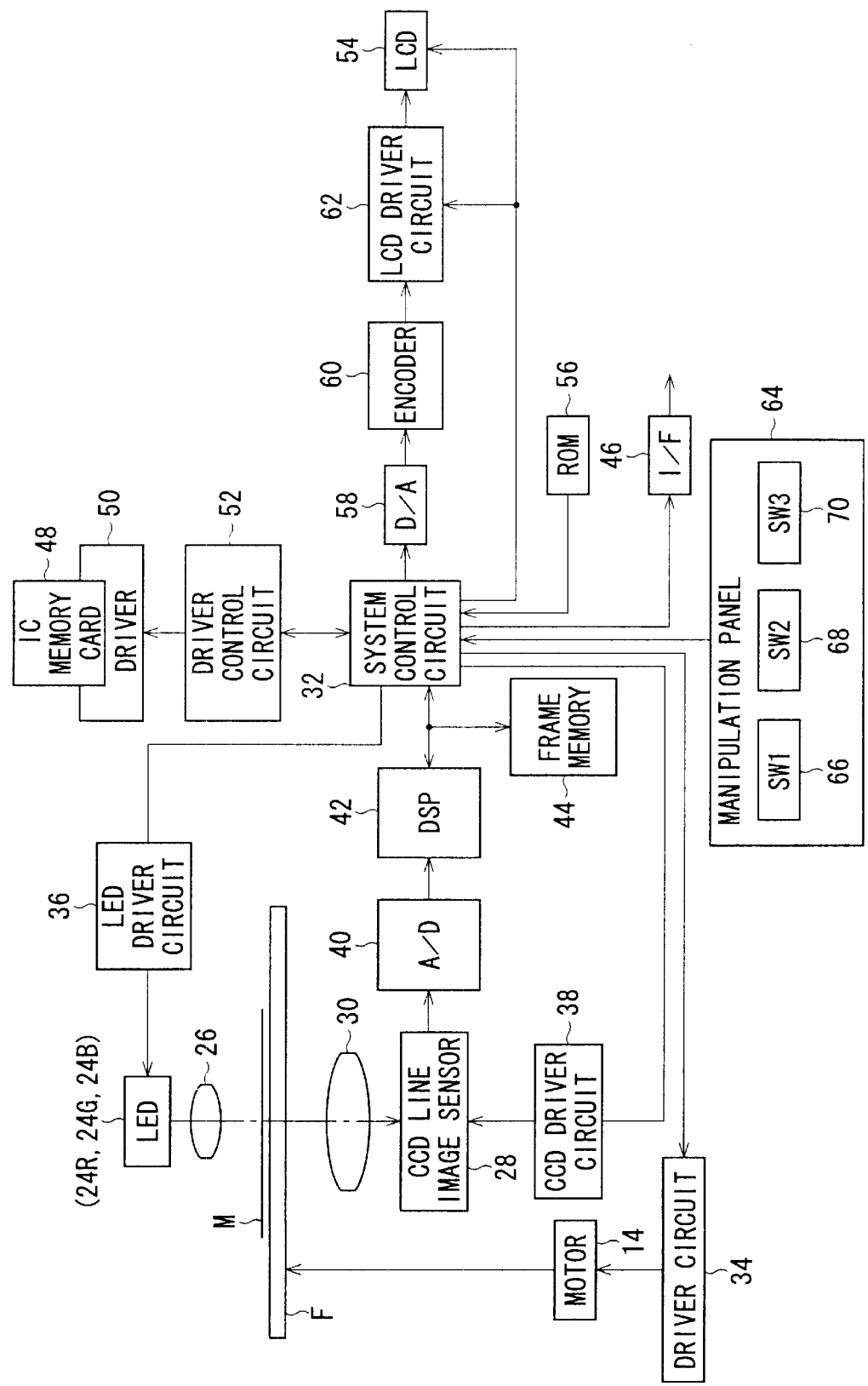
FIG. 2 is a schematic block diagram of the image reader shown in FIG. 1.

FIG. 2 schematically shows a block diagram of the image reader shown in FIG. 1. The image reader is provided with a system control circuit 32, which may be constituted as a microcomputer comprising a central processing unit (CPU), a read-only memory (ROM) for storing programs, constants, etc, and a random access memory (RAM) for storing temporary data.

As shown in FIG. 2, the drive motor 14 is connected to the system control circuit 32, through a driver circuit 34, and is driven on the basis of a series of drive pulses output from the driver circuit 34, which is operated under control of the system control circuit 32. The motor 14 is intermittently driven in such a manner that the plate-like carriage 10, and therefore the transparency object M, is intermittently moved to pass between the cylindrical condenser lens 26 and the focusing lens system 30, whereby the transparency object M is scanned in a step-by-step manner with the CCD line image sensor 28. Note, the pre-reading operation is executed with a rougher scan-pitch than that of the regular-reading operation.

The LED's 24R, 24G and 24B of the light source 20 are connected to the system control circuit 32, via an LED driver circuit 36, and are electrically powered by the LED driver circuit 36, which is operated under control of the system control circuit 32.

In this embodiment, during the regular-reading operation, the red LED's 24R, the green LED's 24G and the blue LED's 24B are cyclically and successively turned ON, as mentioned previously, and the emissions of the three-primary colors of light from the light source 20 are cyclically repeated in the order of the red-light emission, the green-light emission and the blue-light emission during the intermittent stoppage of the carriage 10. In other words, the transparency object M is subjected to one cycle of the successive emissions of the three-primary colors of light during each standstill of the transparency object M when being intermittently moved.

On the other hand, when the pre-reading operation is executed, the monochromatic-light emitters (24R, 24G, or 24B) may be continuously turned ON over an overall period of the pre-reading operation. Alternatively, the turning-ON of the monochromatic-light emitters (24R, 24G, or 24B) may be performed each standstill of the transparency object M when being intermittently moved during the pre-reading operation.

When the transparency object M is illuminated with the monochromatic light rays (red, green, blue) of the colored light emitters, the monochromatic light rays concerned, having passed through the cylindrical condenser lens 26 and the transparency object M, are focused, by the focusing lens system 30, onto the linear light-receiving surface of the CCD line image sensor 28. Accordingly, when an electronic shutter of the CCD line image sensor 28 is opened, electrical charges are started to be generated and accumulated in the CCD elements of the CCD line image sensor.

The CCD line image sensor 28 is connected to the system control circuit 32, through a CCD driver circuit 38, and is then driven by the CCD driver circuit 38. The accumulated electrical charges are outputted as a single-line of image-pixel signals, from the CCD line image sensor 28, by driving the CCD driver circuit 38 under control of the system control circuit 32.

The single-line of image-pixel signals, output from the CCD line image sensor 28, is suitably amplified, and is then converted into a single-line of digital image-pixel signals by an analog-to-digital (A/D) converter 40. The single-line of digital image-pixel signals, output from the A/D converter 40, is fed to a digital-image-signal processing circuit (DSP) 42, in which the single-line of digital image-pixel signals is subjected to a shading-correction processing and so on. Then, the processed single-line of digital image-pixel signals is temporarily stored in a frame memory 44.

When the pre-reading operation is completed, the memory 44 temporarily stores a frame of monochomatic digital image-pixel signals, which is used to determine whether the image, read from the transparency object M, is recorded thereon as a regular formatted image or a panorama formatted image, as stated in detail hereinafter.

When the regular-reading operation is completed, the memory 44 temporarily stores three frames of three-primary-color digital image-pixel signals: a frame of red digital image-pixel signals, a frame of green digital image-pixel signals and a frame of blue digital image-pixel signals. Then, the three frames of three-primary-color digital image-pixel signals may be directly fed to an external image-processing device, such as an image-processing computer (not shown). In this case, the three frames of three-primary-color digital image-pixel signals are read from the memory 44, and is then output to an interface circuit (I/F) 46, in which each frame of monochromatic image-pixel signals is subjected to a format-conversion processing and so on. Then, the processed three-primary-color digital image-pixel signals are fed from the interface circuit 46 to the image-processing computer.

Optionally, the three frames of three-primary-color digital image-pixel signals may be stored in a hand-carrier-type memory medium, such as an IC memory card, a floppy disk or the like. In this embodiment, the IC memory card, indicated by reference 48, is utilized as the hand-carrier-type memory. Namely, the image reader is provided with an IC memory card driver 50 for the IC memory card 48, and the IC memory card driver 50 is driven by a driver control circuit 52, which is operated under control of the system control circuit 32. In this case, the three frames of three-primary-color digital image-pixel signals are read from the frame memory 44, and are output to the digital-image-signal processing circuit 42, in which the three-primary-color digital image-pixel signals are subjected to a color balance correction processing, a gamma correction processing and so on. Then, the processed three-primary-color digital image-pixel signals are stored in the IC memory card 48 by driving the IC memory card driver 50 with the driver control circuit 52.

As shown in FIG. 2, the image reader is provided with an LCD (liquid crystal display) panel 54 to display various information data, such as date data, operation mode data, setting data and so on. The various information data to be displayed are stored as character code data in a read-only memory (ROM) 56. If necessary, character code data is read from the ROM 56, and digital character pattern signals are produced on the basis of the read character code data. The produced digital character pattern signals are output from the system control circuit 32 to digital-to-analog (D/A) converter 58, in which the digital character pattern signals are converted into analog character pattern signals. Then, the analog character pattern signals are fed to an encoder 60, in which an analog video signal is produced on the basis of the analog character pattern signals. The LCD panel 54 is driven by an LCD driver circuit 62 such that a given information data is displayed on the LCD panel 54 in accordance with the analog video signal produced in the encoder 60.

The image reader also has a manipulation panel 64, on which various switches, indicator lamps and so on are provided. In FIG. 2, three switches (SW1, SW2, SW3), which especially relate to this invention, are indicated by references 66, 68 and 70. The switch (SW1) 66 serves as a power ON/OFF switch, and, of course, the image reader is electrically energized by turning ON the power ON/OFF switch 66. The switch (SW2) 68 serves as a starter switch for an execution of the pre-reading operation, and the switch (SW3) 70 serves as a starter switch for an execution of the regular-reading operation.

Figure 3:
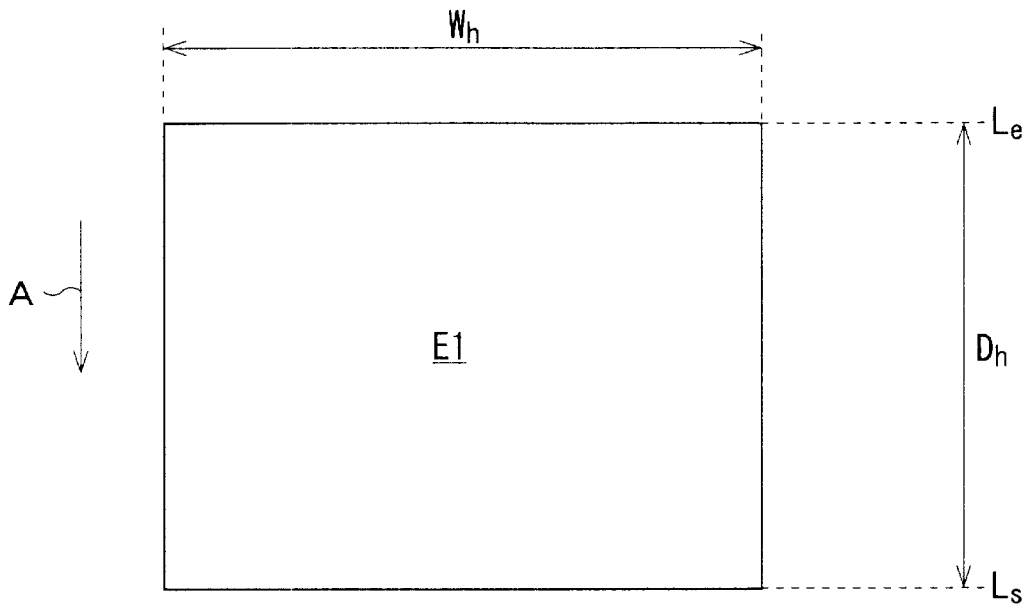
FIG. 3 is a plan view illustratively showing a standardized image-recording frame area of a photographic transparency object.

Referring to FIG. 3, a standardized image-recording frame area of the photographic transparency object M, which is generally indicated by reference E1, is illustratively shown, and has a lateral width of "$W_h$" and a height of "$D_h$". In these drawings, a scanning-direction,, in which the image-recording frame area E1 is scanned with the CCD line image sensor 28, is indicated by an arrow A, and the standardized image-recording frame area E1 is defined by boundaries $L_s$ and $L_e$ in the scanning-direction (A), with a distance between the boundaries $L_s$ and $L_e$ being equal to the height of "$D_h$".

Figure 4:
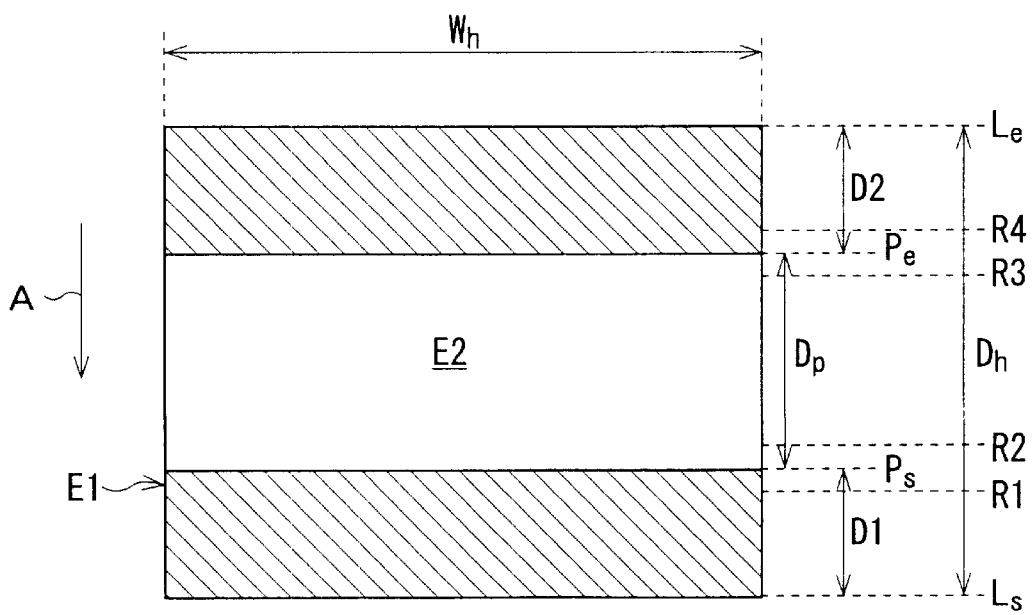
FIG. 4 is a plan view, similar to FIG. 3, showing a panorama image-recording frame area defined on the standardized image-recording frame area of the photographic transparency object.

Referring to FIG. 4, a panorama image-recording frame area of the photographic transparency object M, which is generally indicated by reference E2, is illustratively shown.

This panorama image-recording frame area E2 is defined by masking lower and upper side zones of a standardized image-recording frame area E1, when being photographed in a panorama format mode, each of the masked lower and upper side zones being shown as a hatched zone in FIG. 4. Namely, the panorama image-recording frame area E2 is defined by masking-boundaries $P_s$ and $P_e$ in the scanning-direction A.

In particular, in a new type of camera in which an optical object can be photographed on a photographic film in either a regular format mode or a panorama format mode, when the panorama-photographing-mode is selected, the lower and upper side zones of the standardized image-recording frame area E1 are shielded by mask elements, incorporated in the camera, upon photographing. As shown in FIG. 4, the lower and upper side zones or hatched zones have heights of "D1" and "D2", respectively, and thus the panorama image-recording frame area E2 has a narrowed height of "$D_p$".

It is important to note that, although the size of the standardized image-recording frame area E1 is strictly and preciously regulated, the size of the panorama image-recording frame area E2 is somewhat variable because the size of the mask elements, incorporated in the new type of camera concerned, is not strictly regulated. Namely, the size of the mask elements, used in the concerned type of camera manufactured by a certain camera maker, may be different from that of the mask elements, used in the concerned type of camera manufactured by another camera maker. Thus, as shown in FIG. 4, the lower masking-boundary $P_s$ is variable within a restricted lower range defined by limits R1 and R2, and the upper masking-boundary $P_e$ is variable within a restricted upper range defined by limits R3 and R4. Note, of course, the limits R1 and R2 and the limits R3 and R4 are suitably selected on the basis of a practical investigation of various types of cameras concerned, and each of the lower and upper range has a range width corresponding to, for example, a length of three consecutive scan-pitches in the pre-reading operation.

In the pre-reading operation, a rough-scan-operation is executed such that a standardized image-recording frame area E1 of the transparency object M is fully scanned with the CCD line image sensor 28 at a rough-scan-pitch.

Figure 5:
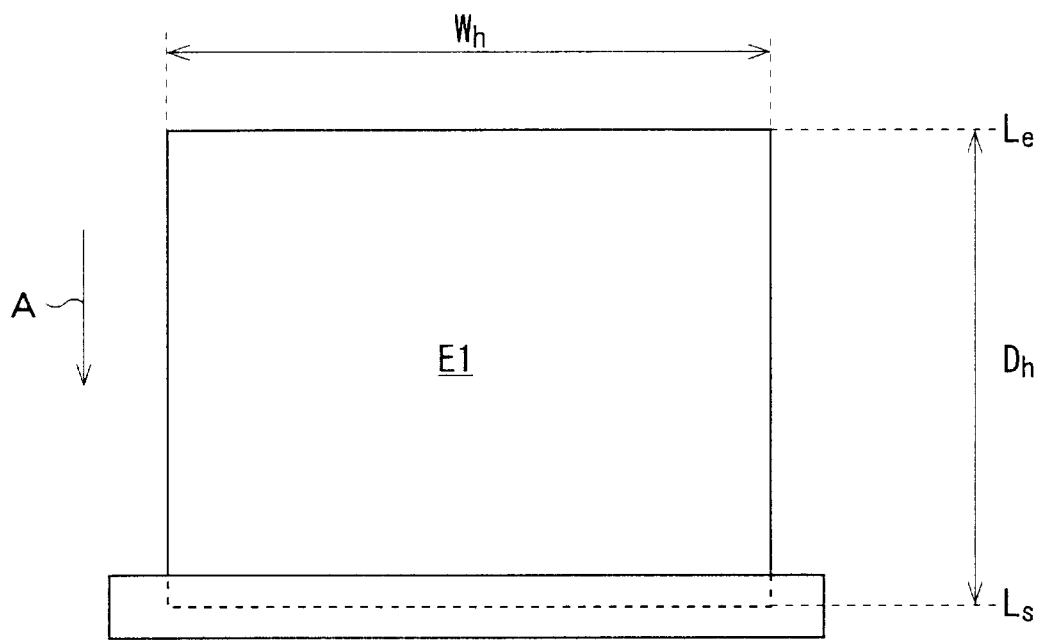
FIG. 5 is a plan view of the standardized image-recording frame area positioned at a regular scan-start-position with respect to a CCD line image sensor of the image reader.
Figure 6:
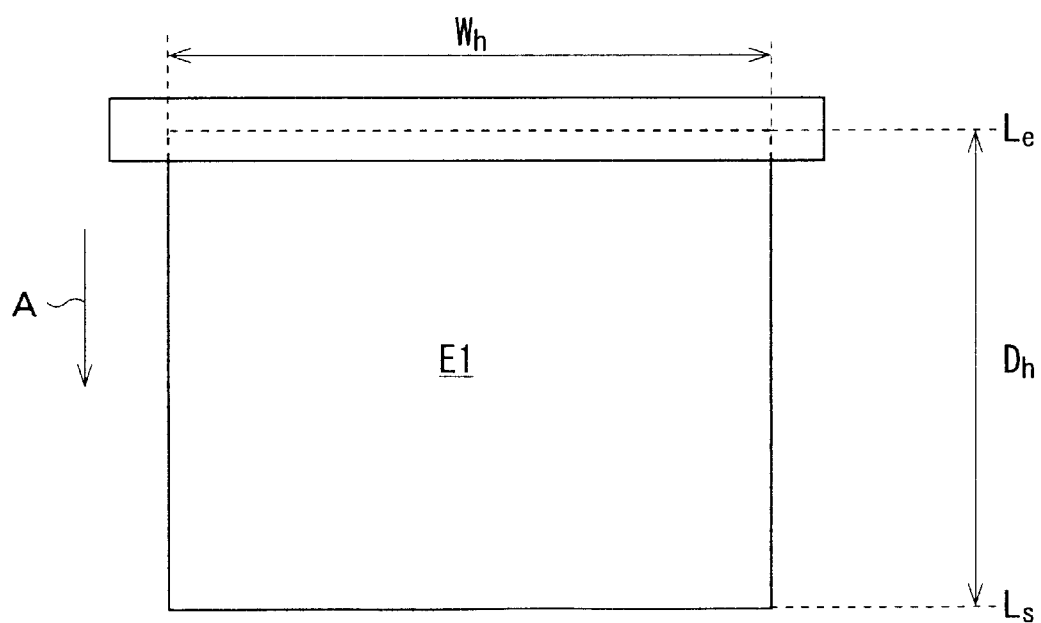
FIG. 6 is a plan view of the standardized image-recording frame area positioned at a regular scan-end-position with respect to the CCD line image sensor.

In particular, first, the plate-like carriage 10 is moved from an initial position (not shown) to a regular scan-start-position, at which a boundary $L_s$ of the standardized image-recording frame area E1 of the transparency object M is positioned just above the linear light-receiving surface of the CCD image sensor 28, as shown in FIG. 5, and is stopped once at the regular scan-start-position. The carriage 10 is intermittently moved at the rough-scan-pitch from the scan-start-position to a scan-end-position, at which the boundary $L_E$ of the standardized image-recording frame area E1 is positioned just above the linear light-receiving surface of the CCD image sensor 28, as shown in FIG. 6, and the image-recording frame area E1 is subjected to the emissions of the monochromatic light from the LED's (24R, 24G or 24B) of the light source 20 during each standstill of the carriage 10 when being intermittently moved.

As stated hereinbefore, at each scanning step, a single-line of image-pixel signals is output from the CCD line image sensor 28, and is converted into a single-line of digital image-pixel signals by the A/D converter 40. When the rough-scan-operation has been completed, a frame of digital image-pixel signals is obtained from the line image sensor 28, and is stored in the frame memory 44.

Figure 7:
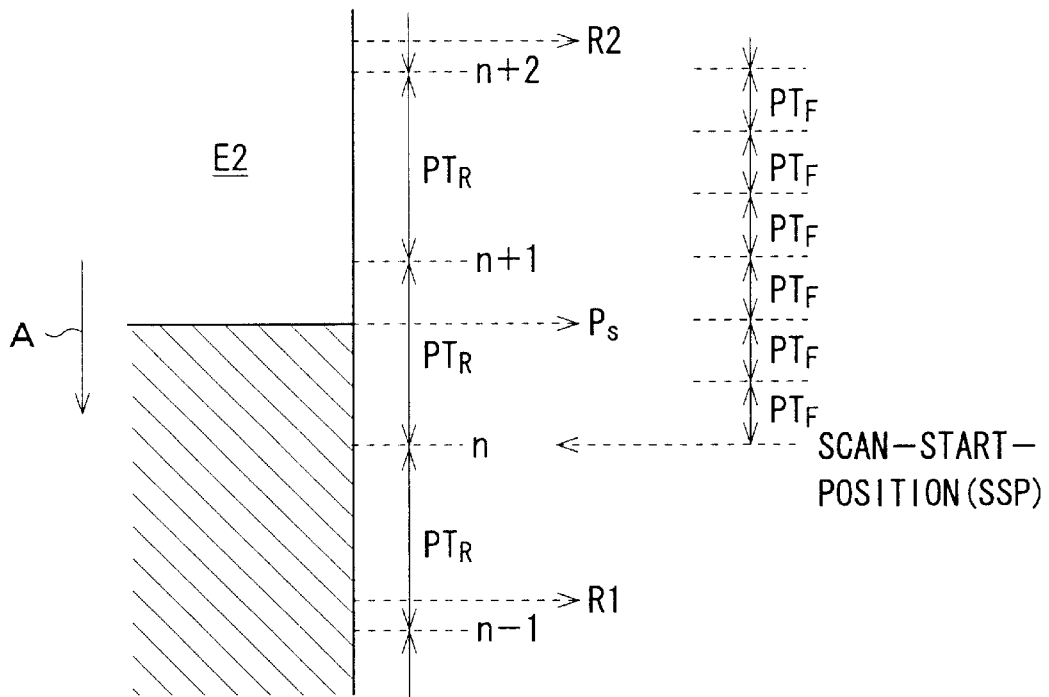
FIG. 7 is an illustrative view for explaining how one of two masking-boundaries, by which the panorama image-recording frame area is defined, is detected.
Figure 8:
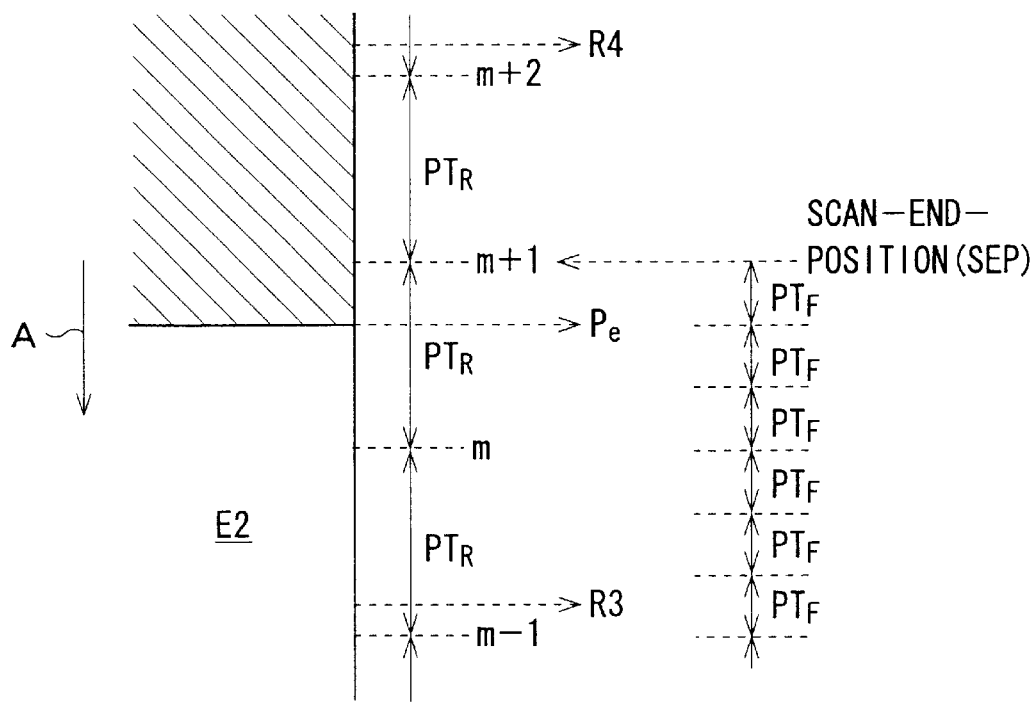
FIG. 8 is an illustrative view, similar to FIG. 7, for explaining how the other masking-boundary is detested.

If the transparency object M concerned carries the panorama-formatted image, it is possible to determine the masking-boundaries $P_s$ and $P_e$ by suitably processing the frame of digital image-pixel signals stored in the frame memory 44, as follows:

First, referring to FIG. 7, four scanning-lines (n−1), n, (n+1) and (n+2), defined by the execution of the rough-scan-operation, are shown by way of example, and the rough-scan-pitch is indicated by reference $PT_R$. As shown in this drawing, if the lower boundary $P_s$ is interposed between the scanning-lines n and (n+1), there must be a drastic change between an average signal-level, derived from a single-line of image-pixel signals obtained at the scanning-line n, and an average signal-level, derived from a single-line of image-pixel signals obtained at the scanning-line (n+1). Similarly, as shown in FIG. 8, if the upper boundary $P_e$ is interposed between two consecutive scanning-lines m and (m+1), there must be a drastic change between an average signal-level, derived from a single-line of image-pixel signals obtained at the scanning-line m, and an average signal-level, derived from a single-line of image-pixel signals obtained at the scanning-line (m+1). Thus, the determination of each masking-boundary ($P_s$, $P_e$) can be performed by detecting the drastic change between the average signal-levels of the two consecutive single-lines of image-pixel signals.

After it is confirmed by the execution of the pre-reading operation that the transparency object M concerned carries the panorama-formatted image, a regular-reading operation is executed to read the panorama-formatted image from the transparency object M. In the regular-reading operation for reading the panorama-formatted image, a fine-scan-operation is executed such that a range defined by the scanning-lines n and (m+1) is scanned with the CCD line image sensor 28 at a fine-scan-pitch $PT_F$ (FIGS. 7 and 8). Thus, the complete reading of the panorama-formatted image from the panorama image-recording frame area E2 can be ensured because this frame area E2 falls within the range defined by the scanning-lines n and (m+1).

In particular, in the fine-scan-operation, first, the plate-like carriage 10 is moved from the initial position (not shown) to a scan-start-position (SSP) corresponding to the scanning-line n defined by the rough-scan-operation, and is stopped once at the scan-start-position (SSP). The carriage 10 is intermittently moved at the fine-scan-pitch $PT_F$ from the scan-start-position (SSP) to a scan-end-position corresponding to the scanning-line (m+1) defined by the rough-scan-operation. Of course, as already stated, the panorama image-recording frame area E2 is subjected to one cycle of the successive emissions of the three-primary colors of lights from the LED's 24R, 24G and 24B of the light source 20 during each standstill of the carriage 10 when being intermittently moved.

The scan-start-position (SSP) and the scan-end-position (SEP) are defined by the following calculations:

$$SSP = \alpha * n$$

$$SEP = \alpha * (m+1)$$

Herein: "α" is a ratio of the rough-scan-pitch $PT_R$ to the fine-scan-pitch $PT_F$, and each of "n" and "(m+1)" represents a number of scanning-lines. Note, in the example shown in FIGS. 7 and 8, the ratio α is "3".

Figure 9:
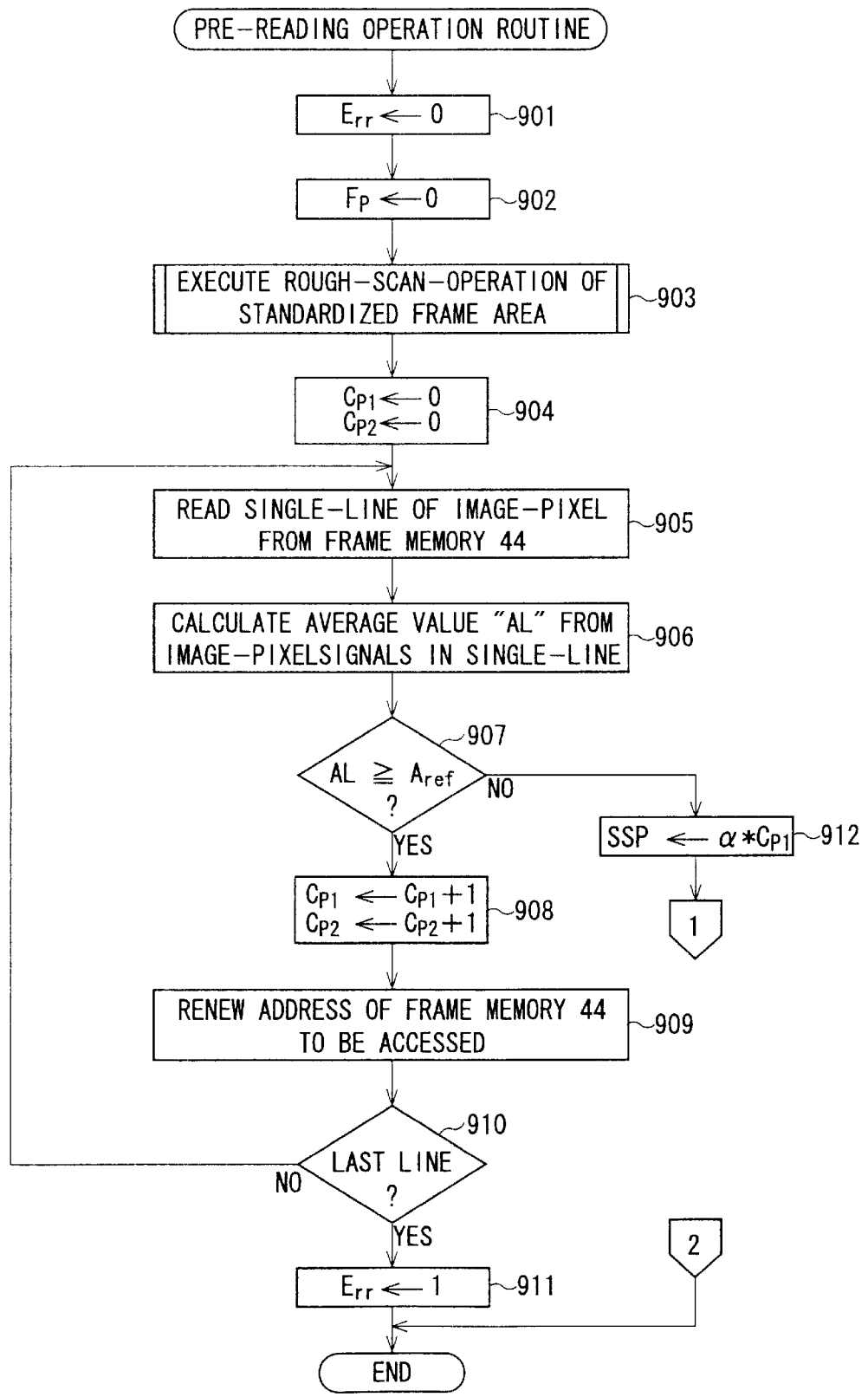
FIG. 9 is a part of a flowchart showing a pre-reading operation routine executed in the image reader according to the present invention.
Figure 10:
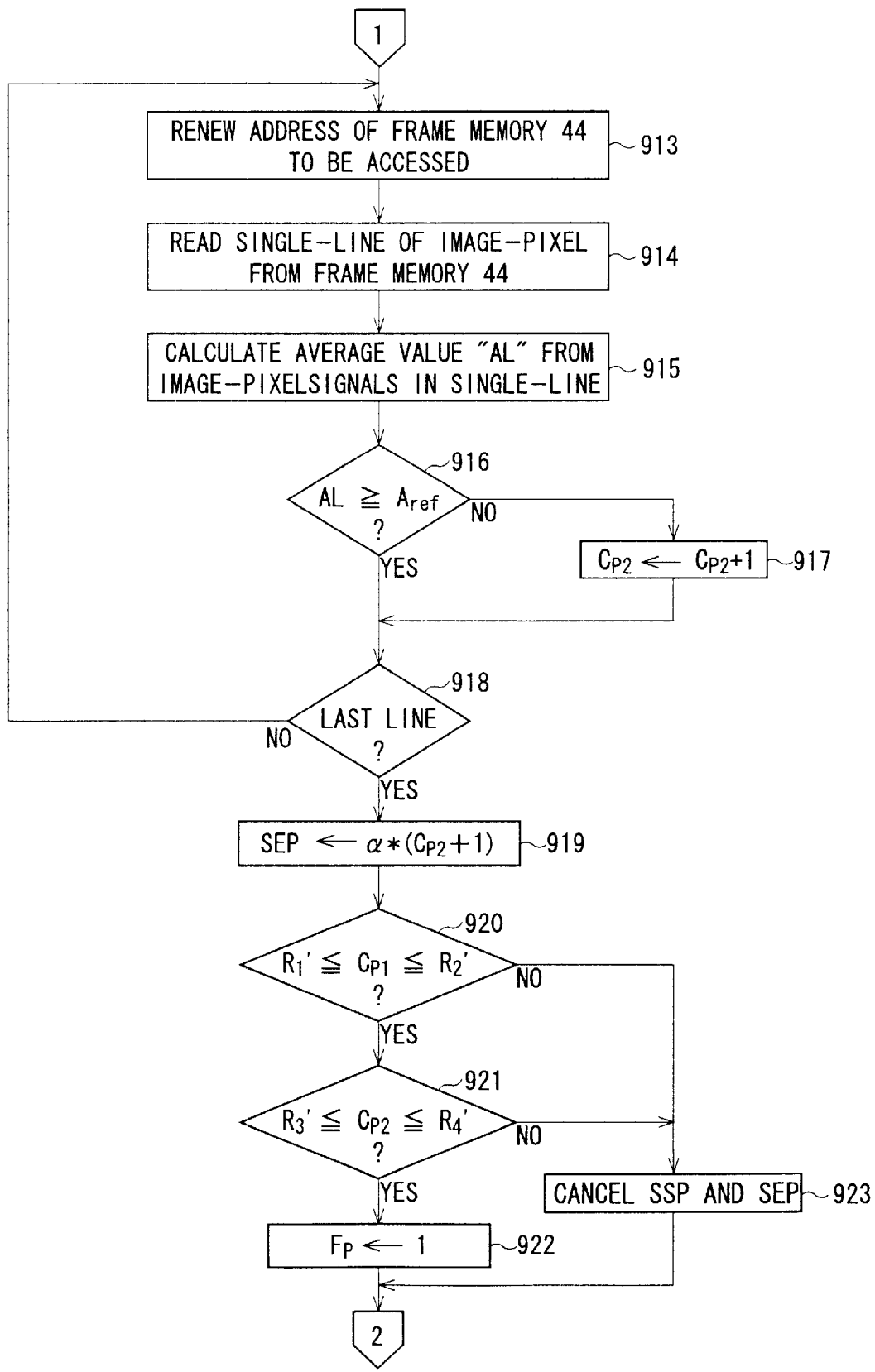
FIG. 10 is the remaining part of the flowchart showing the pre-reading operation routine referred to in FIG. 9.

FIGS. 9 and 10 show a flowchart of a pre-reading operation routine executed in the system control circuit 32, and the execution is started by turning ON the starter switch (SW2) 68. Note, in this pre-reading operation routine, it is supposed that the transparency object M is a negative transparency carrying a negative image recorded thereon.

At step 901, an error-indicating flag $E_{rr}$ is made to be "0". The error-indicating flag $E_{rr}$ is to indicate whether a transparency object (M), set in the image reader, F carries a properly-recorded image which is worth reading. Namely, when an unexposed (i.e. not photographed) transparency object (M) is mistakenly set in the image reader, the error-indicating flag $E_{rr}$ is made to be "1", as stated hereinafter.

Then, at step 902, a panorama-image-indicating flag $F_p$ is made to be "0". The panorama-image-indicating flag $F_p$ is to indicate whether an image, recorded on the transparency object M, is a regular-formatted image or a panorama-formatted image. Namely, when it is confirmed that the image, recorded on the transparency object M, is the panorama-formatted image, the panorama-image-indicating flag $F_p$ is made to be "1", as stated hereinafter.

At step 903, a rough-scan-operation is executed such that a standardized image-recording frame area E1 of the transparency object M is fully scanned with the CCD line image sensor 28 at the rough-scan-pitch $PT_R$, as stated above with reference to FIGS. 5 and 6. Of course, when the rough-scan-operation has been completed, a frame of digital image-pixel signals is obtained from the line image sensor 28, and is stored in the frame memory 44.

After the completion of the rough-scan-operation, the control proceeds to step 904, in which first and second line counters $C_{p1}$ and $C_{p2}$ are reset to "0". Note, when the image of the transparency object M is the panorama-formatted image, the first and second line counters $C_{p1}$ and $C_{p2}$ are used to detect the mask-boundaries $P_s$ and $P_e$, respectively.

At step 905, an address of the frame memory 44, in which a first single-line of digital image-pixel signals is stored, is accessed, and the first single-line of digital image-pixel signals is read from the frame memory 44. Then, at step 906, an average signal-level AL is calculated from signal-levels of the digital image-pixel signals included in the first single-line.

At step 907, it is determined whether the calculated average signal-level AL is equal to or greater than a threshold level value or reference signal-level $A_{ref}$. For example, when each digital image-pixel signal is represented by eight bits, a setting of "250" is given to the reference signal-level $A_{ref}$. Note, the setting of "250" is somewhat smaller than the maximum black level "255", which represents an unexposed black level of the negative transparency object M.

Note, if the frame of digital image-pixel signals, stored in the memory 44, is obtained from the transparency object M carrying the panorama-formatted image, an average signal-level of a single-line of image-pixel signals, derived from each of the masked and unexposed lower and upper side zones of the transparency object M, must exhibits the unexposed black level of the negative transparency object M.

At step 907, if $AL \geq A_{ref}$, i.e. if the average signal-level exhibits the unexposed black level of the negative transparency object M, the control proceeds to step 908, in which a count number of each line counters ($C_{p1}$, $C_{p2}$) is incremented by "1". Then, at step 909, an address of the frame memory 44 to be accessed is renewed, and, at step 910, it is determined whether a single-line of digital image-pixel signals stored in the renewed address is the last one. Unless the single-line of digital image-pixel signals stored in the renewed address is the last one, the control returns to step 905.

Namely, by repeatedly executing the routine comprising steps 905, 906, 907, 908, 909 and 910, it is detected whether there is a drastic change between average signal-levels obtained from two consecutive single-lines of image-pixel signals. If any drastic changes are not detected from the transparency object M, this transparency object M is considered as an unexposed transparency carrying no recorded image. In this case, the control proceeds from step 910 to step 911, in which the error-indicating flag $E_{rr}$ is made to be "1". Then, the pre-reading operation routine ends.

On the other hand, at step 907, if $AL<A_{ref}$, i.e. if there is a drastic change between average signal-levels of two consecutive single-lines of image-pixel signals, it is supposed that the masking-boundary $P_s$ is interposed between the two adjacent scanning-lines, from which the two consecutive single-lines of image-pixel signals concerned are obtained. In this case, the control proceeds from step 907 to step 912, in wich the following calculation is executed:

$$SSP \leftarrow \alpha * C_{p1}$$

Note, at this time, a counter number of the first line counter $C_{p1}$ corresponds to the scanning-line n shown in FIG. 7. The calculated result SSP is stored as a scan-start-position data in the RAM of the system control circuit 32.

At step 913 (FIG. 10), an address of the frame memory 44 to be accessed is renewed, and, at step 914, a single-line of digital image-pixel signals is read from the renewed address of the frame memory 44. Then, at step 915, an average signal-level AL is calculated from signal-levels of the digital image-pixel signals included in the first single-line.

At step 916, it is determined whether the calculated average signal-level AL is equal to or greater than the reference signal-level $A_{ref}$. If $AL<A_{ref}$, the control proceeds from step 916 to step 917, in which the count number of the second line counter $C_{p2}$ is incremented by "1". Then, at step 918, it is determined whether the single-line of digital image-pixel signals concerned is the last one. Unless the single-line of digital image-pixel signals concerned is the last one, the control returns to step 913.

Namely, by repeatedly executing the routine comprising steps 913, 914, 915, 916, 917 and 918, it is detected whether there is a drastic change between average signal-levels obtained from two consecutive single-lines of image-pixel signals. At step 916, if $AL \geq A_{ref}$, i.e. if there is a drastic change between average signal-levels of two consecutive single-lines of image-pixel signals, the control directly proceeds from step 916 to step 918, whereby the increment of the count number at the second line counter $C_{p2}$ is stopped. Of course, in this case, it is supposed that the masking-boundary $P_e$ is interposed between the two adjacent scanning-lines, from which the two consecutive single-lines of image-pixel signals concerned are obtained.

At step 919, the following calculation is executed:

$$SEP \leftarrow \alpha * (C_{p2}+1)$$

Note, at this time, a counter number of the second line counter $C_{p2}$ corresponds to the scanning-line (m+1) shown in FIG. 8. The calculated result SEP is stored as a scan-end-position data in the RAM of the system control circuit 32.

At step 920, it is determined whether the count number of the first line counter $C_{p1}$ falls within a numerical range defined by numerical values R1' and R2', which correspond to the limits R1 and R2 defining the restricted lower range as shown in FIG. 7. If $R1' \leq C_{p1} \leq R2'$, the control proceeds from step 920 to step 921, in which it is determined whether the count number of the second line counter $C_{p2}$ falls within a numerical range defined by numerical values R3' and R4', which correspond to the limits R3 and R4 defining the restricted upper range as shown in FIG. 8. If R3'≦$C_{p2}$≦R4', the control proceeds to step 922, in which the panorama-image-indicating flag $F_p$ is made to be "1". Then, the pre-reading operation ends.

Of course, If R1'≦$C_{p1}$≦R2', and If R3'≦$C_{p2}$≦R4', it is confirmed that the transparency object M concerned carries the panorama-formatted image, and the calculated SSP and SEP can be properly estimated as representing the scan-start-position and the scan-end-position for reading the panorama-formatted image by a fine-scan-operation.

On the other hand, when the count number of the first line counter $C_{p1}$ is out of the numerical range defined by the numerical values R1' and R2', and/or when the count number of the second line counter $C_{p2}$ is out of the numerical range defined by the numerical values R3' and R4', it is confirmed that the transparency object M concerned carries the regular-formatted image. In this case, at step 923, the calculated results SSP and SEP are canceled, and the pre-reading operation ends, with the value of the panorama-image-indicating flag $F_p$ being kept to be, i.e. zero.

Figure 11A:
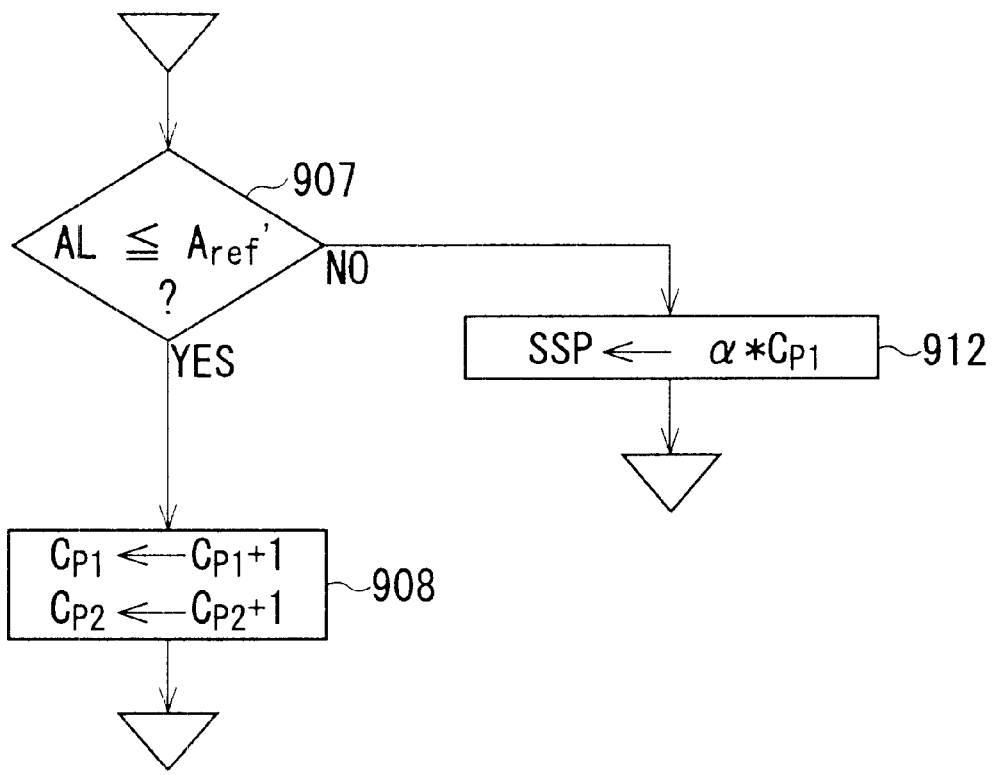
FIG. 11(A) is a part of a modification of the flowchart shown in FIGS. 9 and 10.
Figure 11B:
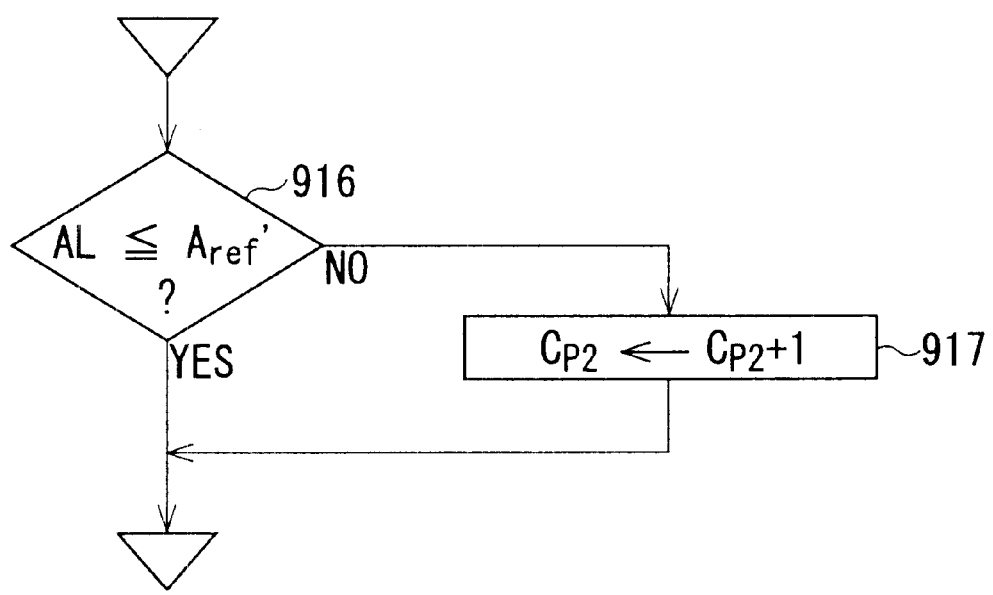
FIG. 11(B) is another part of the modified flowchart referred to in FIG. 11(A)

Note, when the transparency object M is a positive transparency carrying a positive image recorded thereon, it is possible to detect the masking-boundaries $L_s$ and $L_e$ of the panorama image-recording frame area E2 by modifying only steps 907 and 916 of the pre-reading operation routine (FIGS. 9 and 10), as shown in FIG. 11. In this case, at each of steps 907 and 913, it is determined whether the calculated average signal-level AL is equal to or smaller than a threshold level value or reference signal-level $A_{ref}'$. For example, when each digital image-pixel signal is represented by eight bits, a setting of "10" is given to the reference signal-level $A_{ref}'$. Note, the setting of "10" is somewhat greater than the minimum black level or maximum pellucidity level "0", which represents an unexposed pellucidity level of the positive transparency object M.

Figure 12:
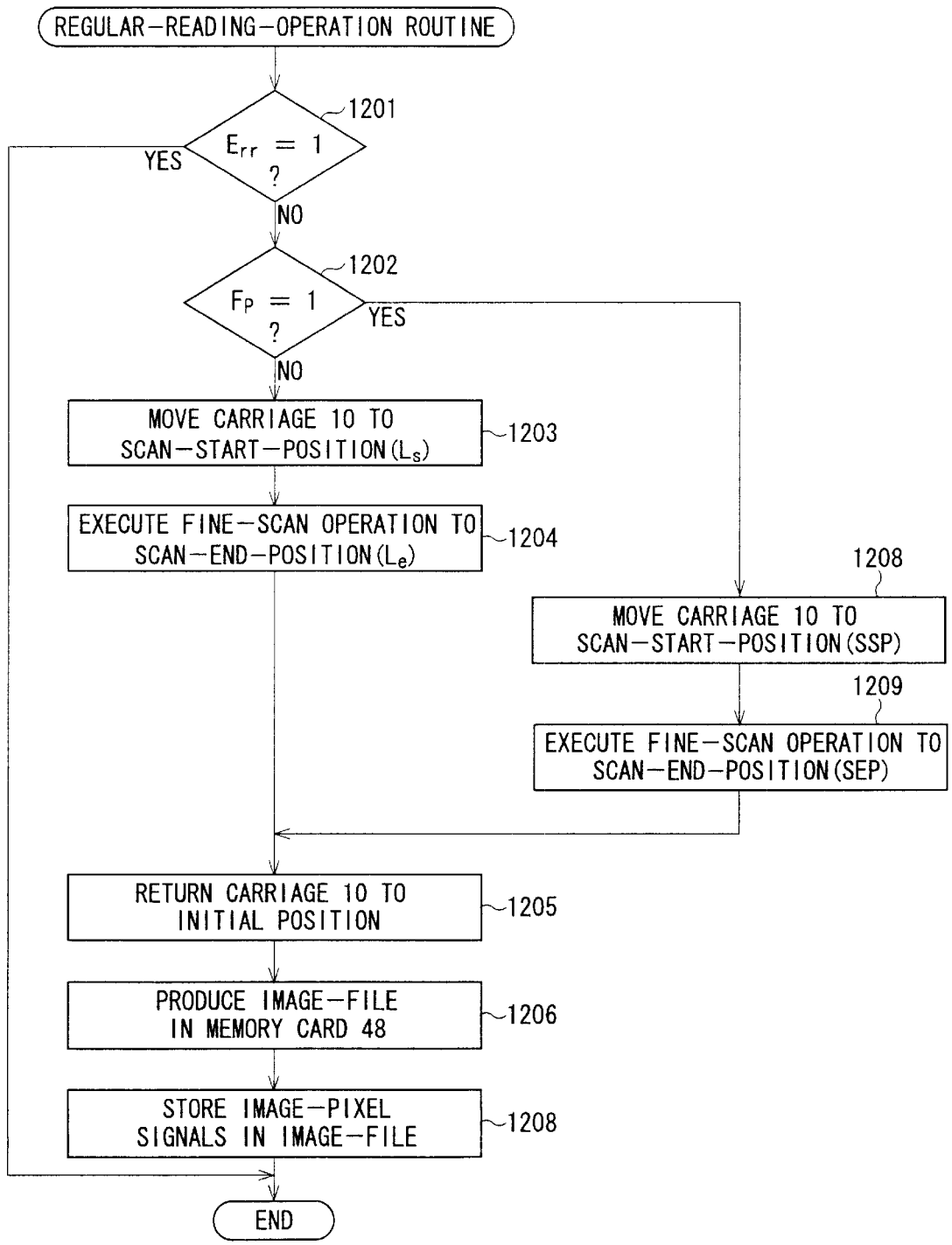
FIG. 12 is a flowchart showing a regular-reading operation routine executed in the image reader according to the present invention.

FIG. 12 shows a flowchart of a regular-reading operation routine executed in the system control circuit 32, and the execution is started by turning ON the starter switch (SW3) 70 after the execution of the pre-reading operation.

At step 1201, it is determined whether the error-indicating flag $E_{rr}$ is "1" or "0". As mentioned above, if $E_{rr}$=1, since the transparency object M concerned carries no recorded image, the regular-reading operation routine immediately ends.

If $E_{rr}$=0, i.e. if the transparency object M concerned carries a recorded image which is worth reading, the control proceeds to step 1202, in which the panorama-image-indicating flag $F_p$ is "1" or "0". As mentioned above, if $F_p$=0, the transparency object M concerned carries a regular-formatted image, and, if $F_p$=1, the transparency object M concerned carries a panorama-formatted image.

If $F_p$=0, the control proceeds to step 1203, in which the carriage 10 is moved from the initial position to a regular scan-start-position, at which the boundary $L_s$ of the standardized image-recording frame area E1 of the transparency object M is positioned just above the linear light-receiving surface of the CCD image sensor 28 (FIG. 5), and is stopped once at the regular scan-start-position.

At step 1204, a fine-scan operation is executed at the fine-scan-pitch $PT_F$. Namely, the carriage 10 is intermittently moved at the fine-scan-pitch $PT_F$ from the regular scan-start-position ($L_s$) to a regular scan-end-position, at which the boundary $L_e$ of the standardized image-recording frame area E1 of the transparency object M is positioned just above the linear light-receiving surface of the CCD image sensor 28 (FIG. 6). Of course, the standardized image-recording frame area E1 is subjected to one cycle of the successive emissions of the three-primary colors of lights from the LED's 24R, 24G and 24B of the light source 20 during each standstill of the carriage 10 when being intermittently moved.

After the execution of the fine-scan operation is completed, the control proceeds to step 1205, in which the carriage 10 is returned to the initial position. At step 1206, an image-file is produced and defined in the IC memory card 48, and, at step 1207, a frame of three-primary color image-pixels is stored in the image-file produced and defined in the IC memory card 48. Then, the regular-reading operation routine ends.

At step 1202, if $F_p$=1, i.e. if the transparency object M carries a panorama-formatted image, the control proceeds from step 1202 to step 1208, in which the carriage 10 is moved from the initial position to the scan-start-position (SSP), obtained at step 912 of the pre-reading operation routine (FIGS. 9 and 10), corresponding to the scanning-line n shown in FIG. 7, and is once stopped at the scan-start-position (SSP). Of course, the movement of the carriage 10 from the initial position to the scan-start-position (SSP) is continuously carried out without being intermitted.

At step 1209, a fine-scan operation is executed at the fine-scan-pitch $PT_F$. Namely, the carriage 10 is intermittently moved at the fine-scan-pitch $PT_F$ from the scan-start-position (SSP) to the scan-end-position (SEP), obtained at step 919 of the pre-reading operation routine (FIGS. 9 and 10), corresponding to the scanning-line (m+1) shown in FIG. 8. Of course, the panorama image-recording frame area E2 is subjected to one cycle of the successive emissions of the three-primary colors of lights from the LED's 24R, 24G and 24B of the light source 20 during each standstill of the carriage 10 when being intermittently moved.

After the execution of the fine-scan operation is completed, the control proceeds from step 1209 to step 1205, in which the carriage 10 is returned to the initial position. Similarly, at step 1206, an image-file is produced and defined in the IC memory card 48, and, at step 1207, a frame of three-primary color image-pixels is stored in the image-file produced and defined in the IC memory card 48. Then, the regular-reading operation routine ends.

As is apparent from the foregoing, according to the present invention, when a transparency object carries an panorama formatted image, masked and unexposed lower and upper side zones of a standardized image-recording frame area of the transparency object cannot be uselessly read scanned with a CCD line image sensor.

In the type of image reader as mentioned above, prior to an execution of a regular-reading operation, a pre-reading operation is frequently executed to determine an optimum exposure time for the CCD image sensor 28, because the optimum exposure time is varied in accordance with a change in transparency of a recorded image of the transparent object M. A frame of image-pixel signals, obtained by the execution of this pre-reading operation, may be utilized to determine whether an image recorded on the transparent object M is the regular-formatted image or the panorama-formatted image.

Finally, it will be understood by those skilled in the art that the foregoing description is of the preferred embodiments of the device and that various changes and modifications may be made to the present invention without departing from the spirit and scope thereof.

The present disclosure relates to subject matter contained in Japanese patent application no. 10-203219 (filed on Jul. 17, 1998), which is expressly incorporated herein, by reference, in its entirety.

What is claimed is:

1. An image reader comprising:

a line image sensor that optically and electronically senses and reads by scanning an image-recording area of a recording medium;

a regular-reading controller that controls said line image sensor to execute a regular reading operation such that the image-recording area of said recording medium is scanned at a regular-reading-scan-pitch;

a pre-reading controller that controls said line image sensor to execute a pre-reading operation, prior to the execution of said regular-reading operation, such that the image-recording area of said recording medium is scanned at a pre-reading-scan-pitch;

a determiner that determines whether an image to be read from said recording medium is recorded on a whole of said image-recording area or a restricted area of said image-recording area on a basis of a series of image-pixel data obtained by the execution of said pre-reading operation; and a regular-reading regulator that regulates the execution of said regular-reading operation such that the restricted area of said image-recording area is scanned with said line image sensor when it is determined by said determiner that said image to be read from said recording medium is recorded on the restricted area of said image-recording area, wherein said determiner comprises:

a detector that detects two scanning-lines, which respectively correspond to two single-lines of image-pixel data obtained by the execution of said pre-reading operation, defining a minimum range of the restricted area of said image-reading area;

a first calculator that calculates one of said two scanning-lines as a scan-start-position for the restricted area of said image-recording area on a basis of said pre-reading-scan-pitch and said regular-reading-scan-pitch when said two scanning-lines are detected by said detector; and a second calculator that calculates another of said two scanning-lines as a scan-end-position for the restricted area of said image-recording area on a basis of said pre-reading-scan-pitch and said regular-reading-scan-pitch when said two scanning-lines are detected by said detector.

2. An image reader as set forth in claim 1, wherein said pre-reading-scan-pitch is rougher than said regular-reading-scan-pitch.

3. An image reader as set forth in claim 1, wherein said regular-reading regulator comprises:

a first driver controller that relatively and continuously moves said recording medium with respect to said line image sensor, until said line image sensor is positioned at said scan-start-position; and a second driver controller that relatively and intermittently moves said recording medium with respect to said line image sensor at said regular-reading-scan-pitch from said scan-start-position to said scan-end-position.

4. An image reader as set forth in claim 1, further comprising a memory medium that temporarily stores the series of image-pixel data obtained by the execution of said pre-reading operation.

5. An image reader as set forth in claim 4, wherein said determiner comprises: a data reader that successively reads a single-line of image-pixel data from said memory medium; a calculator that calculates an-average data from the single-line of image-pixel data, successively read from said memory medium; and a comparator that compares said calculated average data with a predetermined threshold data to determine whether there is a drastic change between two consecutive single-lines of image-pixel data obtained by the execution of said pre-reading operation, whereby it is determined that there is a boundary, defining said restricted image-recording area, between two consecutive scanning-lines, corresponding said two consecutive single-lines of image-pixel data obtained by the execution of said pre-reading operation, when it is determined by said comparator that there is the drastic change between said two consecutive single-lines of image-pixel data.

6. An image reader as set forth in claim 5, wherein said determiner further comprises: a first calculator that calculates a trailing one of said two consecutive scanning-lines as a scan-start-position for the restricted area of said image-recording area on a basis of said pre-reading-scan-pitch and said regular-reading-scan-pitch when the trailing one of said two consecutive scanning-lines is out of the restricted area of said image-recording area; and a second calculator that calculates a leading one of said two consecutive scanning-lines as a scan-end-position for the restricted area of said image-recording area on a basis of said pre-reading-scan-pitch and said regular-reading-scan-pitch when the leading one of said two consecutive scanning-lines is out of the restricted area of said image-recording area.

7. An image reader as set forth in claim 6, wherein said regular-reading regulator comprises: a first driver controller that relatively and continuously moves said recording medium with respect to said line image sensor, without being intermitted, until said line image sensor is positioned at said scan-start-position; and a second driver controller that relatively and intermittently moves said recording medium with respect to said line image sensor at said regular-reading-scan-pitch from said scan-start-position to said scan-end-position.

8. An image reader as set forth in claim 1, wherein said recording medium is a photographic transparency object having a standardized image-recording frame area, and said restricted area is a panorama image-recording frame area defined on said standardized image-recording frame area.

9. An image reader comprising:

a line image sensor that optically and electronically senses and reads by scanning an image-recording area of a recording medium with said line image sensor;

a regular-reading controller that makes said line image sensor execute a regular reading operation such that the image-recording area of said recording medium is scanned at a regular-reading-scan-pitch with said line image sensor;

a pre-reading controller that makes said line image sensor execute a pre-reading operation, prior to the execution of said regular-reading operation, such that the image-recording area of said recording medium is scanned at a pre-reading-scan-pitch with said line image sensor; and a determiner that determines whether an image to be read from said recording medium is recorded on a whole of said image-recording area or a restricted area of said image-recording area on a basis of a series of image-pixel data obtained by the execution of said pre-reading operation, wherein said determiner comprises: a detector that detects two scanning-lines, which respectively correspond to two single-lines of image-pixel data, respectively, obtained by the execution of said pre-reading operation, defining a minimum range in which the restricted area of said image-reading area falls; a first calculator that calculates one of said two scanning-lines as a scan-start-position for the restricted area of said image-recording area on a basis of said pre-reading-scan-pitch and said regular-reading-scan-pitch when said two scanning-lines are detected by said detector; and a second calculator that calculates another of said two scanning-lines as a scan-end-position for the restricted area of said image-recording area on a basis of said pre-reading-scan-pitch and said regular-reading-scan-pitch when said two scanning-lines are detected by said detector, and wherein said regular-reading controller that relatively and continuously moves said recording medium with respect to said line image sensor, without being intermitted, until said line image sensor is positioned at said scan-start-position, and that relatively and intermittently moves said recording medium with respect to said line image sensor at said regular-reading-scan-pitch from said scan-start-position to said scan-end-position, when it is determined by said determiner that said image to be read from said recording medium is recorded on the restricted area of said image-recording area.

10. An image reader comprising:

a line image sensor that optically and electronically senses and reads by scanning an image-recording area of a recording medium;

a regular-reading controller that controls said line image sensor to execute a regular reading operation such that the image-recording area of said recording medium is scanned at a regular-reading-scan-pitch;

a pre-reading controller that controls said line image sensor to execute a pre-reading operation, prior to the execution of said regular-reading operation, such that the image-recording area of said recording medium is scanned at a pre-reading-scan-pitch;

a determiner that determines whether an image to be read from said recording medium is recorded on a whole of said image-recording area or a restricted area of said image-recording area on a basis of a series of image-pixel data obtained by the execution of said pre-reading operation;

a regular-reading regulator that regulates the execution of said regular-reading operation such that the restricted area of said image-recording area is scanned with said line image sensor when it is determined by said determiner that said image to be read from said recording medium is recorded on the restricted area of said image-recording area;

a memory medium that temporarily stores the series of image-pixel data obtained by the execution of said pre-reading operation, wherein said determiner comprises:

a data reader that successively reads a single-line of image-pixel data from said memory medium;

a calculator that calculates an average data from the single-line of image-pixel data, successively read from said memory medium; and a comparator that compares said calculated average data with a predetermined threshold data to determine whether there is a predetermined change between two consecutive single-lines of image-pixel data obtained by the execution of said pre-reading operation, whereby it is determined that there is a boundary, defining said restricted image-recording area, between two consecutive scanning-lines, corresponding to said two consecutive single-lines of image-pixel data obtained by the execution of said pre-reading operation, when it is determined by said comparator that there is the predetermined change between said two consecutive single-lines of image-pixel data.

11. The image reader as set forth in claim 10, wherein said determiner further comprises:

a first calculator that calculates a trailing one of said two consecutive scanning-lines as a scan-start-position for the restricted area of said image-recording area on a basis of said pre-reading-scan-pitch and said regular-reading-scan-pitch when the trailing one of said two consecutive scanning-lines is out of the restricted area of said image-recording area; and a second calculator that calculates a leading one of said two consecutive scanning-lines as a scan-end-position for the restricted area of said image-recording area on a basis of said pre-reading-scan-pitch and said regular-reading-scan-pitch when the leading one of said two consecutive scanning-lines is out of the restricted area of said image-recording area.

12. The image reader as set forth in claim 11, wherein said regular-reading regulator comprises:

a first driver controller that relatively and continuously moves said recording medium with respect to said line image sensor, until said line image sensor is positioned at said scan-start-position; and a second driver controller that relatively and intermittently moves said recording medium with respect to said line image sensor at said regular-reading-scan-pitch from said scan-start-position to said scan-end-position.

* * * * *